United States Patent [19]

Skubic et al.

[11] Patent Number: 5,039,566
[45] Date of Patent: Aug. 13, 1991

[54] TRANSPARENT COMPOSITE MATERIAL

[75] Inventors: Raymond J. Skubic, Florissant; James O. Stoffer; Delbert E. Day, both of Rolla; Steven E. Baldini, St. Charles, all of Mo.

[73] Assignee: McDonnell Douglas Corporation, St. Louis, Mo.

[21] Appl. No.: 211,823

[22] Filed: Jun. 27, 1988

[51] Int. Cl.$^5$ .............................................. B32B 5/12
[52] U.S. Cl. ................... 428/113; 427/430.1; 428/290; 428/285; 428/294; 428/391; 428/429; 428/902
[58] Field of Search ............... 428/113, 268, 273, 288, 428/297, 290, 294, 285, 391, 429, 903, 902; 523/214; 524/853; 427/430.1

[56] References Cited

U.S. PATENT DOCUMENTS

| | | |
|---|---|---|
| 3,461,027 | 8/1969 | Plueddemann ..................... 428/429 |
| 3,525,658 | 8/1970 | Setz .......................................... 161/1 |
| 3,773,607 | 11/1973 | Marzocchi ........................ 428/429 |
| 4,035,550 | 7/1977 | Suh et al. ............................ 428/429 |
| 4,056,651 | 11/1977 | Scolon ................................ 428/429 |
| 4,230,769 | 10/1980 | Goossens ........................... 428/429 |
| 4,358,502 | 11/1982 | Dunbar ................................ 428/429 |
| 4,455,343 | 6/1984 | Temple .............................. 428/429 |
| 4,457,970 | 7/1984 | Das et al. ........................... 428/429 |
| 4,477,528 | 10/1984 | Frye .................................... 428/429 |
| 4,487,797 | 12/1984 | Watson .............................. 428/290 |
| 4,500,600 | 2/1985 | Wong et al. ....................... 428/429 |
| 4,547,421 | 10/1985 | Dunbar .............................. 428/290 |
| 4,559,262 | 12/1985 | Cogswell et al. ................. 428/294 |
| 4,604,319 | 8/1986 | Evans et al. ....................... 428/290 |
| 4,835,057 | 5/1989 | Bagley et al. ..................... 428/429 |
| 4,938,823 | 7/1990 | Balazek et al. ................... 428/294 |

FOREIGN PATENT DOCUMENTS 263257 11/1965 Australia .
2207643 9/1987 Japan .

Primary Examiner—James J. Bell
Attorney, Agent, or Firm—Gravely, Lieder & Woodruff

[57] ABSTRACT

A transparent composite material, which may take the form of a plate, includes a polymeric matrix and glass fibers embedded within the matrix. The polymer of the matrix and the glass of the fibers are transparent and have substantially the same index of refraction. A bond exists between the glass of the fibers and the polymer of the matrix. The composite may be formed by immersing the fibers in a monomer and then curing the monomer to a polymer.

17 Claims, 1 Drawing Sheet

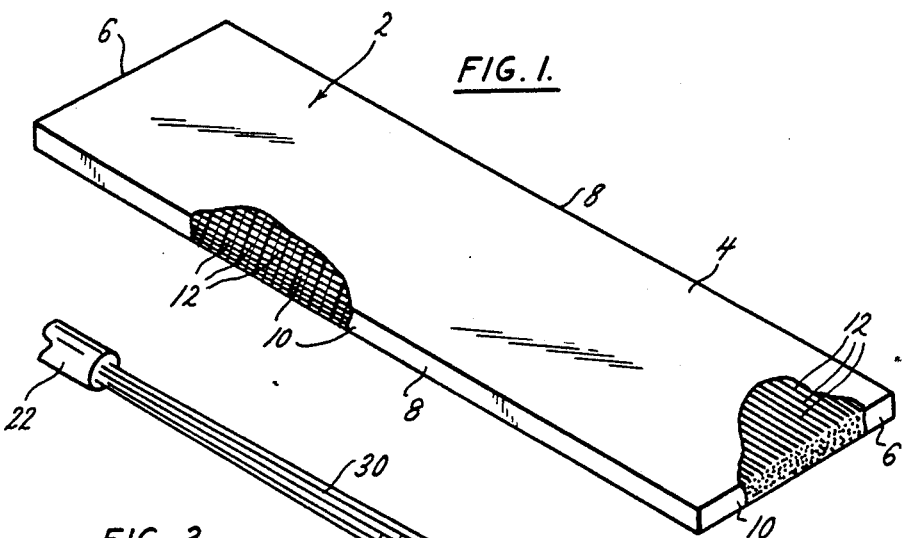
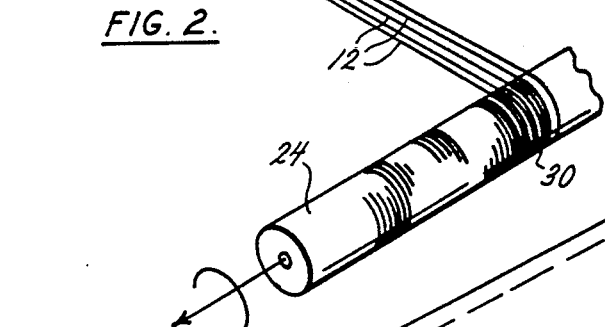
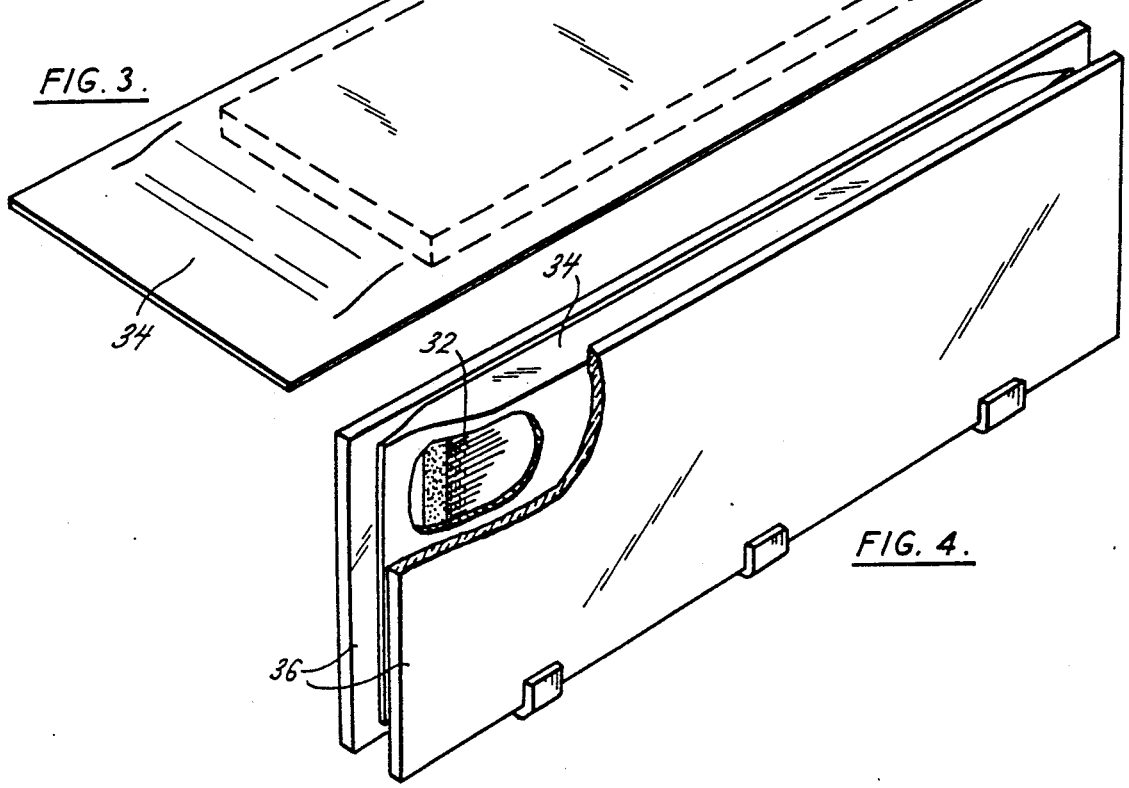

TRANSPARENT COMPOSITE MATERIAL

BACKGROUND OF THE INVENTION

This invention relates in general to transparent materials and more particularly to a transparent composite material containing glass fibers and a polymeric matrix and to a process for producing such a material.

Of all the materials that are transparent in the sense that they transmit radiant energy within the visible spectrum, glass is perhaps the most common, and well it should be, because it is hard and generally resistant to abrasion, chemically inert in the presence of most other substances, and relatively inexpensive. While these characteristics render glass quite suitable for use as a glazing material in buildings, glass is not totally acceptable for use as windows in transportation vehicles, particularly aircraft. This resides in the fact that glass is heavy, brittle to the extent that it may shatter upon impact, and difficult to form into complex shapes. Manufacturers of aircraft have accordingly to a large measure turned to transparent polymers, such as acrylic and polycarbonate, for the windows and canopies of their aircraft. But polymers, while being light in weight and certainly more flexible and easier to form than glass, do not possess the strength of glass.

As a consequence, the polymeric side windows of aircraft are of very limited area. Windshields and canopies possess far greater area, but they are usually thicker and thus heavier than side windows. Even so, windshields and canopies are more vulnerable, because they are subject to bird impacts.

A need exists in the aircraft industry for a lightweight transparent material that possesses substantial strength—indeed enough strength to withstand bird impacts. Yet the material should be thin and somewhat resilient so that it will flex without shattering when subjected to an impact concentrated in a small area. Moreover, the material should be relatively inexpensive. It should also be capable of being formed into the complex configurations typical of the canopies of fighter aircraft.

DESCRIPTION OF THE DRAWINGS

In the accompanying drawings which form part of the specification and wherein like numerals and letters refer to like parts wherever they occur—

FIG. 1 is a perspective view of a plate formed from the composite material of the present invention, the matrix of the plate being partially broken away to show the fibers embedded within it;

FIG. 2 is a schematic view showing the equipment used to derive the fibers for the composite material;

FIG. 3 is a schematic view showing a stack of fibers being inserted into a bag into which a monomer is introduced; and FIG. 4 is a schematic view showing the bag interposed between mold walls as the monomer is cured to a polymer.

DETAILED DESCRIPTION

Referring now to the drawings, a sheet or plate 2 (FIG. 1), which is formed from a transparent composite material, has parallel front and back surfaces 4, and end edges 6 and side edges 8. The four edges 6 and 8 circumscribe the two surfaces 4 which form the major surface areas of the plate 2 and together form the peripheral edge of the plate 2. Being formed from transparent materials, the plate 2 itself is transparent. The composite material possesses substantial strength, yet is light in weight. It is also relatively thin, and somewhat resilient, so that it will flex in the presence of an impact concentrated at a small area in it instead of shattering. Through forming procedures that are conventional in the plastics industry, the composite material may be converted into more complex shapes. The plate 2, being flat, is suitable for use in aircraft windows. Large sheets of the composite material may be configured to form the canopies of high performance aircraft.

The composite material of the plate 2 basically includes two components, namely a polymeric matrix 10 and glass fibers 12 which are embedded in the matrix 10. The polymer of the matrix 10 may be one of the traditional polymers used for transparent objects, polymethyl methacrylate (acrylic) being the most common. Polycarbonate is also suitable as are practically all transparent polymers. While the polymer of the matrix 10 has reasonable strength and thereby imparts strength to the plate 2, the strength is enhanced by the fibers 12 which are embedded in the polymer of the matrix 10.

The fibers 12 are preferably glass and in diameter should be as small as possible, since flaws and discontinuities diminish with size, and this of course reduces stress concentrations. Hence, the tensile strength increases with the reduction of the diameter. As a practical matter, it is difficult to produce glass fibers having a diameter less than about 6 micrometers, so fibers within the range of 6 to 50 micrometers will suffice. The individual fibers 12 should extend from one end edge 6 of the plate 2 to the other end edge 6 without interruption, that is to say, each fiber 12 should be continuous across the full width of the plate 2. This affords maximum strength. Moreover, the continuous fibers 12 lie generally parallel to each other and are presented inwardly from the major surfaces 4, that is they are truly embedded in the matrix 10 so as not to be exposed at the surfaces 4. The fibers 12 should occupy between 10 and 50% of the full volume of the plate 2 and should preferably occupy 25% of the full volume. To ascertain the cross-sectional area of a group of fibers, one may establish an average diameter for the fibers and multiply that by the approximate number of fibers. One may also compute the cross-sectional area of a group of fibers if one knows the weight of the glass fibers, the density of the glass and the dimensions for plate 2.

The strength of the plate 2 may be tailored by constructing it as a laminate consisting of individual plies or laminae, each with continuous and parallel fibers 12. However, the orientation of the fibers 12 varies between plies from zero to 90°. Preferably the fibers 12 of the various layers are oriented at 0°, 45° and 90° with respect to each other when the plate 2 is a laminate. In other words, the parallel fibers 12 of any layer, while extending between two different edges 6,8 of the plate 2, are arranged at angles with respect to the parallel fibers 12 in adjacent layers.

While continuous and parallel fibers 12 produce superb structural characteristics, the plate 2 may be constructed with discontinuous and randomly oriented fibers 12. These fibers 12 are uniformly distributed in the matrix 10, each ranging in length from 50 micrometers to 2 centimeters.

Like the polymer of the matrix 10, the glass of the fibers 12 should be transparent, and indeed the indices of refraction for the glass of the fibers 12 and the polymer of the matrix 10 should be the same or substantially the same. This renders the fibers 12 totally imperceptible within the matrix 10, enabling the plate 2 to conduct light with the same intensity and clarity as the polymer of the matrix 10 itself. Where the index of refraction for the polymer of the matrix 10 varies with temperature, the matching of the indices of refraction should exist at the normal operating temperature for the plate 2.

Glass and organic polymers, such as acrylic or polycarbonate, do not have a natural affinity for each other, and the absence of a good bond between the glass and the polymer will detract from the structural properties of the plate 2 and will further impair its optical qualities. In this regard, it is believed that the failure to bond enables the glass fibers 12 to slip relative to the polymeric matrix 10 under loads, and this prevents the matrix 10 from transfering much of the stress to the fibers 12. Moreover, the absence of good bonds is no doubt characterized by thin layers of air that surround the fibers 12 and detract from the optical qualities of the composite plate 2.

In order to effect a good bond between the fibers 12 and the polymer of the matrix 10, a bonding or coupling agent is applied to the fibers 12 as a coating. In the presence of such an agent, the fibers 12 and polymeric matrix 10 bond tightly together, with the bond being totally devoid of encapsulated air. One substance suitable for use as a bonding or coupling agent is methacryloxypropyltrimethoxy-silane. This substance, which is often referred to simply as silane, possesses the following molecular formula:

This silane, which possesses a molecular weight of 248.3 and a density of 1.045, is available from Petrarch Systems, Inc.

Other silanes are also suitable. A silane coupling agent may be described as a molecule which possesses two classes of functionality, a readily hydrolyzable group and nonhydrolyzable organic radical. Both are bound to the same silicon atom. The hydrolyzate product, silanol, subsequently reacts with a siliceous inorganic substrate. The silanols can also react with metal oxides of aluminum, zirconium, tin, iron, and boron. The nonhydrolyzable organic radical possesses a specific organic functionality capable of interacting with polymers. The general formula is given below:

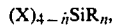

where "X" is the hydrolyzable group; chlorine, alkoxy or acyloxy and "R" is the organic radical.

Several theories exist as to how a silane joins the glass to the polymer, but the most logical concludes that the silane coating promotes a covalent linkage between the polymer and the glass. In other words, the silane coating produces a chemical bond between polymer of the matrix 10 and the glass of the fibers 12. This is believed to reflect what actually occurs and indeed studies seem to confirm it.

To obtain the glass fibers 12, optical glass having an index of refraction corresponding to that of the polymer selected for the matrix 10 is broken into pieces about the size of a typical marble, and these pieces are placed in a bushing or container 22 (FIG. 2) that is heated with a resistance-type heating element. The bushing 22, which is formed from or at least lined with a material, such as platinum that is inert to the glass at elevated temperatures, contains numerous orifices which are somewhat larger than the diameter of the fibers 12. Typically the orifices may be 300 to 1000 micrometers in diameter. The bushing 22 initially heats the glass to raise its temperature somewhat above the melting temperature, whereupon gas bubbles trapped in the melt rise to the surface and escape. Once the molten glass is bubble free and chemically homogeneous, the temperature of the bushing 22 is reduced enough to bring the melt to a viscosity suitable for extruding. The molten glass is allowed to flow from the orifices; indeed it is extruded from the orifices, producing a multitude of fibers 12—one from each orifice. The ends of the extruded fibers are collected and are attached in a row to the cylindrical surface of an aluminum drum 24. The drum 24 rotates about its cylindrical axis and further translates along that axis so that the extruded fibers 12 spiral about the drum 24, producing a layer or a strip 30 of fibers 12 on the drum 24. The surface velocity of the rotating drum 24 exceeds the velocity at which the fibers 12 extrude, so that the fibers 12 remain taut between the bushing 22 and drum 24 and further are stretched somewhat in this region, thus acquiring a diameter significantly less than that of the orifices in the bushing 22. Hence, the speed of rotation to a measure controls the diameter of the fibers 12. It also has an effect on the index of refraction for some optical glasses. When the fibers 12 reach a length somewhat in excess of the width selected for the plate 2, the drum 24 is halted and epoxy ribbons are glued across the strip 30 of fibers 12 at two locations about 2 centimeters apart, whereupon the strip 30 of fibers 12 is removed from the drum 24 by cutting the strip 30 between the two epoxy ribbons.

The strips 30 of fibers 12 are stored in a vacuum where they remain perfectly dry. Indeed, the strips 30 may be stacked one upon the other with plastic sheets interposed between the strips 30.

In the plate 2, the fibers 12 are embedded within the polymeric matrix 10, and of course the matrix 10 must be formed about the fibers 12. To achieve this end, enough strips 30 of fibers 12 are removed from the dry vacuum to produce the requisite cross-section of fibers 12 in the plate 2. The strips 30 so removed are laid upon a clean dry surface to create a stack 32 (FIG. 3) in which all of the fibers 12 are parallel. At both ends of the stack 32, the ends of these strips 30 are glued together with epoxy to secure the mass of fibers 12 within the stack 32.

Next the stack 32 of fibers 12 is inserted into a bag 34 (FIG. 3) which is formed from a plastic material that is incompatible with the substance from which the polymer of the matrix 10 is derived in the sense that that substance will not adhere to or react with the bag 34. Plastic bag stock in a tubular format will suffice for this purpose, and one end of the bag tube is closed with a heat seal. Within the bag 34 the ends of the stack 32 of fibers 12 are as far apart as possible so that the fibers 12 remain straight and parallel.

Once the stack 32 of fibers 12 is properly disposed within the bag 34, a liquid formulation containing essentially a suitable monomer is poured into the bag 34, the monomer being suitable in the sense that upon being cured it will transform into the polymer selected for the matrix 10. The monomer also contains an initiator, a cross-linker and a coupling agent, which may be silane. Indeed, the monomer must contain enough of the coupling agent to enable it to completely wet all of the fibers 12 in the bag 34. The opposite end of the bag 34 is then partially closed with another heat seal which leaves the interior of the bag 34 still exposed to the surrounding atmosphere. The bag 34 is then placed within a vacuum dessicator where it is maintained at a reduced pressure on the order of 22 mm Hg for about 2 hours. This allows dissolved and absorbed gases to escape from the liquid. To dislodge gas bubbles which cling to the fibers 12, the bag 34 and monomer within it should be subjected to occasional vibrations. Thereafter, the vacuum is removed and the bag 34 is withdrawn from the dessicator. The seal at the partially sealed end is then extended to produce a complete seal at that end.

Next the sealed bag 34 is placed between a pair of glass plates 36 (FIG. 4), the spacing between which is only slightly greater than the thickness desired for the composite plate 2. The glass plates 36 along with the bag 34 and its contents are placed within a water bath maintained at a closely controlled temperature—indeed at a temperature which will cause polymerization to occur over a period of a few days to 4 weeks. Since the polymerization of some monomers is exothermic, care must be exercised to ensure that the monomer does not boil, vaporize and burst the bag 34.

The polymerization of course converts the monomer into the polymeric matrix 10 which encapsulates the fibers 12 and indeed bonds to the fibers 12 by reason of the silane coating. Once the polymerization is complete, the bag 34 is removed from the space between the glass plates 36 and the composite plate 2 is removed from the bag 34. The plate 2 is then heated for about 12 hours at a temperature that will insure all of the monomer converts to a polymer.

Thereafter the plate 2 may be cut to a desired size and its surfaces 4 are polished. If the polymer of the matrix 10 is thermoplastic, the plate 2 may also be shaped simply by heating the plate 2 enough to render it plastic and then deforming it over a suitable mold.

The plate 2 possesses substantial strength, yet is thin, light in weight, and somewhat flexible. In typical fighter aircraft applications it need not be any thicker than about 15 to 20 millimeters.

EXAMPLE

Polymethyl methacrylate and an appropriate glass, such as BK 10 optical glass, are well suited for use in the composite plate 12 as the matrix 10 and fibers 12, respectively. The former is a commercially available product known more commonly as acrylic. The latter is available from Schott Glass Technologies, Inc., of Duryea, Pennsylvania.

The glass is broken into small marble-size pieces and placed in the bushing 22 where it is heated to 1350° C. At this temperature the glass exists in a molten state and gas bubbles escape from it. Then the molten glass is allowed to cool to an extrusion temperature between 1150° C. and 1260° C. and within this range it likewise remains molten. The molten glass is extruded from the orifices in the bushing 22 and collected as a strip 30 on the drum 24 which both rotates and translates so that the strip 30 spirals about the surface of the drum 24, the angular velocity of the drum 24 being such that the extruded fibers 12 attenuate somewhat and acquire a diameter ranging between 10 and 50 micrometers (FIG. 2). The ends of each strip 30 of fibers 12 are glued together, and the strips 30 are stacked with plastic sheets between successive strips 30 and stored in a vacuum dry box.

When the time arrives to complete the plate 2, enough strips 30 of fibers 12 are removed from the vacuum dry box to provide the proportion of fibers 12 desired for the composite plate 2, that being 25% of total volume in this instance. Indeed, the strips 30 are stacked one upon the other over a clean dry surface so that fibers of all of the strips are parallel. The ends of the strips 30 at both ends of the stack 32 are then joined together with epoxy. The stack 32 is inserted into a plastic bag 34 with care being exercised to ensure that all of the fibers 12 within the bag remain straight and parallel (FIG. 3). While one end of the bag 34 is closed with a heat seal, the other end remains open.

With the stack 32 of fibers 12 contained within the bag 34, a formulation of the following composition based on weight is introduced into the bag 34:

| | |
|---|---|
| methyl metacrylate monomer | 95.5% |
| initiator | 0.5% |
| cross-linker | 1.0% |
| methacryloxypropyltrimethoxy-silane coating agent | 3.0% |
| | 100% |

The bag 34 is then partially sealed at its opposite end and placed in vacuum dessicator where it is maintained at about 22 mm Hg for 2 hours. The monomer formulation is subjected to occasional vibration during this interval. The vacuum removes dissolved and absorbed gases from the formulation.

Next the bag 34 is totally sealed and placed between the glass plates 36 which are spaced about 1 to 2 centimeters apart. The glass plates 36 together with bag 34 are then immersed in a water bath which is maintained at a constant 25° C. The bag 34 remains between the glass plates 36 within the bath for a few days to 4 weeks—long enough for substantially complete polymerization to occur. The resulting polymer, which is in effect the matrix 10 having the fibers 12 embedded in it, is then removed from the bag 34 and introduced into an oven where it is maintained at 110° C. for about 12 hrs. This assures complete polymerization.

Finally, the sides and ends of the resulting plate 2 are trimmed to provide the end and side edges 6 and 8 and the surfaces 4 are polished to enhance the optical qualities of the plate 2.

In one typical plate 2 containing about 14% BK 10 glass fibers 12 by volume within an acrylic matrix 10, the plate 2 had an overall optical transmission of 43.3% of the incident light at wavelength of 589 nanometers. The modulus of rupture was 47,796 lbs/in$^2$, whereas the typical modulus of rupture for acrylic without reinforcement is 14,657 lbs/in$^2$. A plate containing about 33% by volume of BK 10 glass fibers of 13 micrometer diameter had a modulus of rupture exceeding 90,000 lbs/in$^2$ while transmitting about 20% of incident light at 589 nanometers.

This invention is intended to cover all changes and modifications of the example of the invention herein chosen for purposes of the disclosure which do not constitute departures from the spirit and scope of the invention.

What is claimed is:

1. A transparent composite material suitable for use by itself as a glazing material in a window, said material comprising: a transparent polymeric matrix having exposed major surface areas and a peripheral edge; fibers of transparent glass embedded within the matrix, the fibers being continuous within the matrix so that their ends are at the peripheral edge and the fibers are uninterrupted between their ends, the index of refraction for the polymer of the matrix being substantially the same as the index of refraction for the glass of the fibers, so that the fibers are imperceptible in the matrix; and a coupling agent coating the fibers and bonding the fibers to the matrix, such that the composite material so formed remains transparent.

2. A transparent material according to claim 1 wherein the matrix has opposite margins which form part of the peripheral edge and the fibers extend uninterrupted between the opposite margins.

3. A transparent material according to claim 1 wherein the fibers occupy between about 15% and 35% by volume of the composite material.

4. A transparent material according to claim 1 wherein the fibers are bonded to the polymer of the matrix.

5. A transparent material according to claim 1 wherein the fibers are chemically bonded to the polymer of the matrix by the coupling agent.

6. A transparent material according to claim 1 wherein the matrix has margins and the fibers are arranged in layers with the fibers of any layer being generally parallel to each other.

7. A transparent material according to claim 1 wherein the diameter of the glass fibers does not exceed about 50 micrometers.

8. A transparent material suitable for use by itself as a glazing material in a window, said material comprising: a polymeric matrix having edges and first and second surfaces circumscribed by the edges, the first and second surfaces being exposed; and a multitude of glass fibers embedded within the matrix, the glass of the fibers and the polymer of the matrix being transparent and having substantially the same index of refraction, substantially all of the fibers extending from edge to edge and being continuous between the edges to which they extend.

9. A transparent material according to claim 8 wherein the fibers are generally parallel.

10. A transparent material according to claim 9 wherein two of the edges are located on opposite sides of the matrix and substantially all of the parallel fibers extend without interruption between those two edges.

11. A transparent laminate material according to claim 8 wherein the fibers are arranged in layers with the fibers of any layer extending between edges of the matrix and being generally parallel to each other; and wherein the fibers of a layer are arranged at an angle with respect to the fibers of the adjacent layer.

12. A transparent material according to claim 8 and further comprising a bonding agent coating the fibers and effecting a bond between the fibers and the polymer of the matrix, such that the material remains transparent.

13. A process for forming a transparent composite material, said process comprising: immersing glass fibers within a monomer containing a bonding agent so that the fibers are essentially continuous through the monomer: and curing the monomer so that it becomes a polymer which forms a matrix in which the fibers are embedded, with the ends of the fibers being at the peripheral edge of the matrix and the glass of the fibers being bonded to the polymer of the matrix by the bonding agent; both the polymer and the glass being transparent, with the polymer having an index of refraction that is substantially the same as the index of refraction for the glass of the fibers.

14. The process according to claim 13 and further comprising subjecting the monomer, after the fibers are immersed in it, to a vacuum so that gases entrapped within the monomer escape.

15. The process according to claim 13 wherein the monomer is methyl methacrylate.

16. The process according to claim 13 wherein the bonding agent is methacryloxpropyltrimethoxy-silane.

17. The process according to claim 13 wherein at least some of the fibers are of substantial length and are generally parallel to each other.

* * * * *